W. M. RICKETTS.
DRAFT CONNECTION FOR VEHICLES.
APPLICATION FILED FEB. 5, 1914.

1,126,281.

Patented Jan. 26, 1915.

Witnesses
Geo. E. Kricker Jr
A. L. Phelps

Inventor
William M. Ricketts.

By
C. C. Shepherd
Attorney

UNITED STATES PATENT OFFICE.

WILLIAM M. RICKETTS, OF WESTERVILLE, OHIO.

DRAFT CONNECTION FOR VEHICLES.

1,126,281.     Specification of Letters Patent.     Patented Jan. 26, 1915.

Application filed February 5, 1914. Serial No. 816,835.

*To all whom it may concern:*

Be it known that I, WILLIAM M. RICKETTS, a citizen of the United States, residing at Westerville, in the county of Franklin and State of Ohio, have invented certain new and useful Improvements in Draft Connections for Vehicles, of which the following is a specification.

My invention relates to draft connections for vehicles and is particularly designed to provide an improved and simplified structure in the nature of a uniting connection between the traces of an ordinary harness and such draw bars as whiffletrees, swingletrees, etc.

It is my object to provide a device comparatively simple in its structure which is so formed as to present maximum rigidity and ease of application to position.

Figure 1:
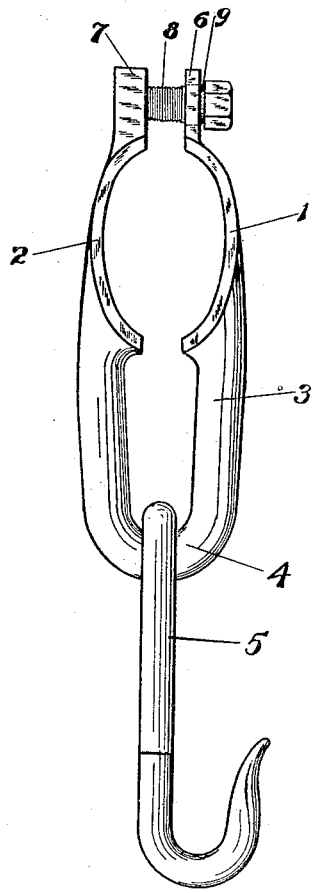
Figure 2:
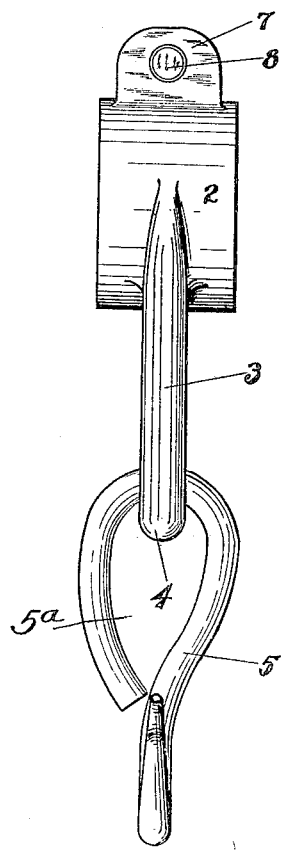

The preferred embodiment of my invention is shown in the accompanying drawings, in which similar characters of reference designate corresponding parts, and in which:

Figure 1 is a view showing my draft connection detached from all of the parts adapted to be connected thereto, and, Fig. 2 is a view taken at right angles to the structure shown in Fig. 1.

In carrying out my invention, I have provided two spaced flat draw bar embracing elements shown at 1 and 2, these elements being preferably of a slightly elliptical shape to conform with the general shape of the ordinary draw bar. These embracing elements are held in their spaced relation by means of the integral connection of a U-shaped member 3, the ends of the legs of which U-shaped member is formed integrally with the elements 1 and 2 and the opposite closed end 4 being formed to accommodate a suitable hook such as is shown at 5. This hook is formed with an eye 5ª slightly longer than the width of the elements 1 and 2 and slightly wider than the thickness of these elements, whereby it is possible to slide the hook into the position shown in the drawings. It will be noted that with this type of structure, all pivotal connections depending upon pivot bolts, etc., have been eliminated and that separation at this point is absolutely impossible, while at the same time, the hook 5 is given a free swivel movement in whatever direction necessary. The ends of the embracing elements 1 and 2 opposite that at which the legs of the U-shaped member 3 are attached, are formed with outwardly projecting ears 6 and 7, each pierced, and one, the ear 7, being threaded to receive the clamping bolt 8. It will be noted that this bolt 8 is provided through the greater portion of its length with a threaded shank, while the portion directly under the head and designated by the numeral 9 is made plain, which will permit tightening of the embracing elements into rigid gripping relation with the type of draw bar used, it being understood that the U-shaped portion 3 is sufficiently resilient to permit of a slight yielding of this nature.

From the above description, it must be apparent that I have provided a comparatively simple device and one in which all mechanically constructed joints have been removed with the exception of the clamping portion. I deem it advisable to provide the clamping bolt 8 to insure a rigid clamping engagement, although it is possible to dispense with this bolt entirely and rely upon the resiliency of the metal itself after the device has been wedged in position, to securely hold it so.

What I claim, is:

A draft connection for vehicles comprising two semi-elliptic bar embracing elements held slightly spaced from each other, and adapted to lie on the top and bottom sides of a vehicle draw bar, a U-shaped member whose ends are rigidly attached one to each of said elements, and a hook normally engaged by said U-shaped member and removable by being slid between said spaced elements, said hook being formed with an eye whose dimensions are such that it is slightly longer than the width of said elements and slightly wider than the thickness of these elements to permit its sliding into a position of engagement with said U-shaped member.

In testimony whereof I affix my signature in presence of two witnesses.

WILLIAM M. RICKETTS.

Witnesses:
WALTER E. L. BOCK,
A. L. PHELPS.

Copies of this patent may be obtained for five cents each, by addressing the "Commissioner of Patents, Washington, D. C."